(12) United States Patent
Kosaka

(10) Patent No.: US 8,274,707 B2
(45) Date of Patent: Sep. 25, 2012

(54) IMAGE PROCESSING APPARATUS, IMAGE PROCESSING METHOD, AND PROGRAM FOR DETERMINING OR COMPUTING AN EXTENDED REGION OF A BLOCK REGION OF IMAGE DATA OR AN INPUT IMAGE

(75) Inventor: Ryo Kosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 761 days.

(21) Appl. No.: 12/431,346

(22) Filed: Apr. 28, 2009

(65) Prior Publication Data

US 2009/0290192 A1    Nov. 26, 2009

(30) Foreign Application Priority Data

May 20, 2008   (JP) .................................. 2008-132324

(51) Int. Cl.
*H04N 1/407*   (2006.01)
*G06T 5/00*    (2006.01)
*G06T 5/20*    (2006.01)

(52) U.S. Cl. ......................... 358/3.27; 382/261; 382/264

(58) Field of Classification Search ................. 358/3.27; 382/261, 264
See application file for complete search history.

(56) References Cited

U.S. PATENT DOCUMENTS

| | | | |
|---|---|---|---|
| 6,704,440 B1 * | 3/2004 | Kump | 382/132 |
| 6,747,758 B1 | 6/2004 | Nishida | |
| 6,950,559 B2 | 9/2005 | Kobayashi | |
| 7,280,249 B2 | 10/2007 | Ohta | |
| 7,319,548 B2 | 1/2008 | Ohta | |
| 2001/0028466 A1 | 10/2001 | Kobayashi | |
| 2002/0196465 A1 | 12/2002 | Ohta | |
| 2007/0002349 A1 * | 1/2007 | Hwang et al. | 358/1.13 |
| 2007/0139710 A1 | 6/2007 | Ohta | |
| 2008/0002230 A1 * | 1/2008 | Sakaue | 358/3.24 |
| 2008/0049240 A1 * | 2/2008 | Yamamoto | 358/1.9 |

FOREIGN PATENT DOCUMENTS

| | | |
|---|---|---|
| JP | 2000-312311 | 11/2000 |
| JP | 2001-103307 A | 4/2001 |
| JP | 2001-251502 A | 9/2001 |

(Continued)

OTHER PUBLICATIONS

Japanese Office Action dated Apr. 20, 2012, in counterpart Japanese Application No. 2008-132324.

*Primary Examiner* — Twyler Haskins
*Assistant Examiner* — Fred Guillermety
(74) *Attorney, Agent, or Firm* — Fitzpatrick, Cella, Harper & Scinto

(57) ABSTRACT

An object of the present invention is to provide an image processing apparatus which provides an image with an extended region of a size suitable for performing block processing. In order to achieve the object, the image processing apparatus according to the present invention includes an input unit for inputting image data and printer setting information of the image data; and an extended region computing unit for dividing the image data into a block region and computing an extended region of the divided block region based on the printer setting information. The apparatus also includes a generating unit for generating a processed block region with the extended region added to the block region; and a processing unit for performing image processing on the processed block region produced by the generating unit.

17 Claims, 15 Drawing Sheets

FOREIGN PATENT DOCUMENTS

| | | |
|---|---|---|
| JP | 2002-288654 | 10/2002 |
| JP | 2003-087563 A | 3/2003 |
| JP | 2003-141532 A | 5/2003 |
| JP | 2003-216365 A | 7/2003 |
| JP | 2004-266461 A | 9/2004 |
| JP | 2005-027016 A | 1/2005 |

* cited by examiner

DOCUMENT STAGE (TOP VIEW)

| [FILTERING PROCESSING (SMOOTHING)] | FINE | NORMAL | USER'S SETTING (WEAK/STRONG) |
|---|---|---|---|
| PDL IMAGE | 9 × 9 | 5 × 5 | 9 × 9 or 5 × 5 |
| SCAN/COPY IMAGE | 13 × 13 | 7 × 7 | 13 × 13 or 7 × 7 |

⋮

| [SMOOTHING PROCESSING] | | FINE | NORMAL | USER'S SETTING (ON/OFF) |
|---|---|---|---|---|
| PDL IMAGE | CHARACTER | ON [ 7×7 ] | ON [ 5×5 ] | ON [ 7×7 ]/ ON [ 5×5 ]/OFF |
| | PHOTOGRAPH /GRAPHICS | OFF | OFF | ON [ 5×5 ]/OFF |
| SCAN /COPY IMAGE | CHARACTER | ON [ 5×5 ] | OFF | ON [ 5×5 ]/OFF |
| | PHOTOGRAPH /GRAPHICS | OFF | OFF | ON [ 5×5 ]/OFF |

FIG.10

| [FILTERING PROCESSING] | | FINE | NORMAL |
|---|---|---|---|
| PDL IMAGE | HIGH COMPRESSIBILITY | 9 × 9 | 5 × 5 |
| | LOW COMPRESSIBILITY | 7 × 7 | 3 × 3 |
| | DATA NOT AVAILABLE | OFF | OFF |
| SCAN/COPY IMAGE | HIGH COMPRESSIBILITY | 13 × 13 | 7 × 7 |
| | LOW COMPRESSIBILITY | 9 × 9 | 5 × 5 |
| | DATA NOT AVAILABLE | OFF | OFF |

⋮

| [SMOOTHING PROCESSING] | | FINE | NORMAL |
|---|---|---|---|
| PDL IMAGE | CHARACTER | ON [ 7×7 ] | ON [ 5×5 ] |
| | PHOTOGRAPH /GRAPHICS | OFF | OFF |
| | DATA NOT AVAILABLE | OFF | OFF |
| SCAN/COPY IMAGE | CHARACTER | ON [ 5×5 ] | OFF |
| | PHOTOGRAPH /GRAPHICS | OFF | OFF |
| | DATA NOT AVAILABLE | OFF | OFF |

FIG.15

IMAGE PROCESSING APPARATUS, IMAGE PROCESSING METHOD, AND PROGRAM FOR DETERMINING OR COMPUTING AN EXTENDED REGION OF A BLOCK REGION OF IMAGE DATA OR AN INPUT IMAGE

BACKGROUND OF THE INVENTION

1. Field of the Invention

The present invention relates to an image processing apparatus, an image processing method, and a program which provide an image with an extended region of a size suitable for performing block processing.

2. Description of the Related Art

Recent copiers have rapidly expanded their functions and improved image quality as digitization advances with image processing inside copiers (internal image processing). In an attempt to provide highly enhanced reproducibility of documents, internal image processing has constantly undergone improvements in resolution from 600 dpi through 1200 dpi to 2400 dpi and in the number of signal bits from 8 bits through 10 bits to 12 bits. Under these circumstances, internal image processing may be performed as band processing, e.g., filtering may be performed when a pixel of interest requires the data of its neighboring pixels. To perform such processing, a massive memory capacity for storing such data will be required depending on the resolution and the number of signal bits.

In this context, as an alternative technique to band processing, attention has now focused on block processing. Block processing is a technique for dividing an input image into regions (blocks) of a certain size to perform image processing block by block. Block processing may be adopted to perform, e.g., filtering which requires the data of surrounding pixels. In this case, some overlapping regions of neighboring blocks need to be added to the periphery of the processed block.

The above-described added overlapping region (extended region) is determined uniquely depending on the filter size. When image processing is performed several times, the extended region is determined as the sum of the extensions required for the respective image processing steps. A certain extended region defined by the filter size is provided to a block, thereby produced is the block attached with the extension for executing block processing. Such block processing makes it possible to significantly reduce the required amount of memory compared with band processing and also enables parallel processing (Japanese Patent Laid-Open No. 2002-288654 and Japanese Patent Laid-Open No. 2000-312311.)

However, the above-described conventional technique inevitably requires to always provide an image with a certain extended region even when internal image processing or a parameter such as a filter coefficient is modified according to the settings of print quality and printing modes or the types of the object of an input image.

It was thus inevitable to provide not only the least amount of required minimum extended region but also the excessive extended region (redundant data region) with respect to the internal image processing and the parameters. This problem caused degradation in efficiency at the time of data transfer and in processing performance.

FIG. 1A and FIG. 1B show examples of the problem with the conventional technology. The conventional technique generates a processed block 804 of 40×40 pixels because an extended region 803 of 4 pixels in width around the block is required to place a filter 802 of 9×9 pixels on a block 801 of 32×32 pixels.

Now, consider the case where the parameters are changed to use a filter 805 of 5×5 pixels instead of the filter 802 of 9×9 pixels. In this case, the amount of a required minimum extended region 806 has a 2-pixel width around the block, and thus a processed block 807 of 36×36 pixels is preferably generated. However, if the system has been designed so as not to allow a change in processing, then even after the parameter has been changed, the size of the extended region 803 required before the parameter is changed cannot be modified. Therefore, a redundant data region 808 to the periphery of the inevitable extended region 806 must be provided. As a result, the redundant data region 808 will be processed unnecessarily, this results in degradation in efficiency at the time of data transfer and in processing performance.

The present invention has been developed in view of the above-described problems. It is therefore an object of the present invention to prevent degradation in transfer efficiency and processing performance by computing the size of a required extended region according to an input image or a user's printer setting to generate efficient processed blocks.

SUMMARY OF THE INVENTION

In order to address the above-described problems, the present invention provides an image processing apparatus which is characterized by including the following units. That is, the apparatus includes an input unit for inputting image data and printer setting information of the image data; and an extended region computing unit for dividing the image data into a block region and computing an extended region of the divided block region based on the printer setting information. The image processing apparatus further includes a generating unit for generating a processed block region with the extended region added to the block region; and a processing unit for performing image processing on the processed block region produced by the generating unit.

The present invention can add an appropriate extended region according to printer setting information to a block region obtained by dividing image data. This makes it possible to eliminate the need for storing data of the excessive extended region, thereby improved processing performance is provided.

Further features of the present invention will become apparent from the following description of exemplary embodiments (with reference to the attached drawings).

BRIEF DESCRIPTION OF THE DRAWINGS

FIG. 10 is a view illustrating an example of a table for associating user instructions with the contents of each processing according to an embodiment;

FIG. 15 is a view illustrating an example of a table for associating the divided block with the contents of the divided block according to the second embodiment.

DESCRIPTION OF THE EMBODIMENTS

First Embodiment

Now, embodiments of the present invention will be described below with reference to the accompanying drawings.

Figure 1A:
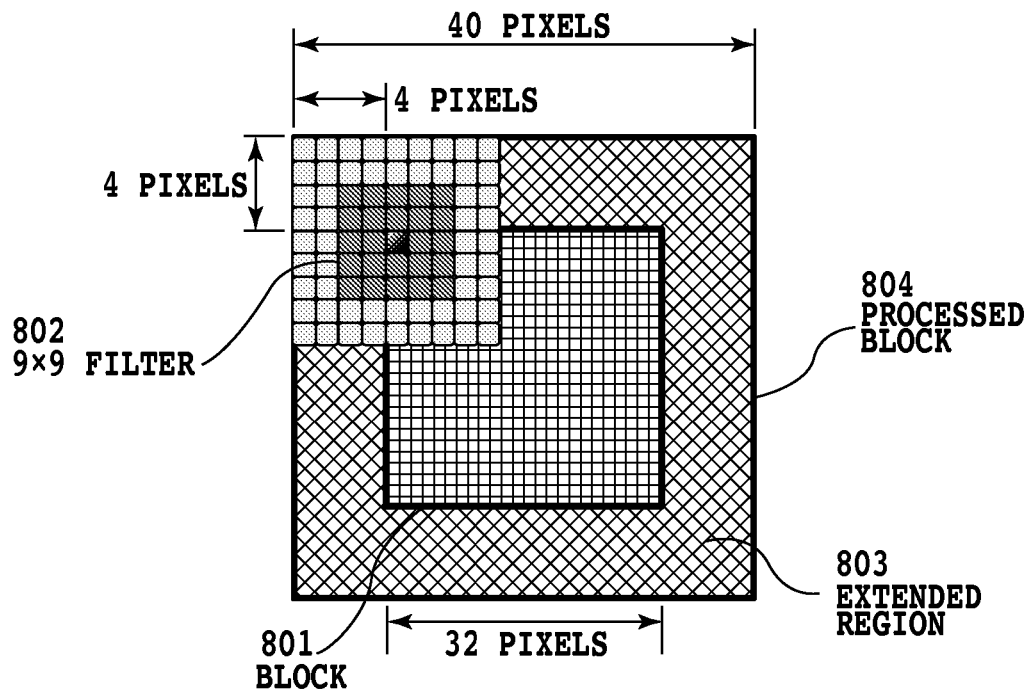
FIG. 1A and FIG. 1B are explanatory views illustrating an example of a conventional technique.
Figure 1B:
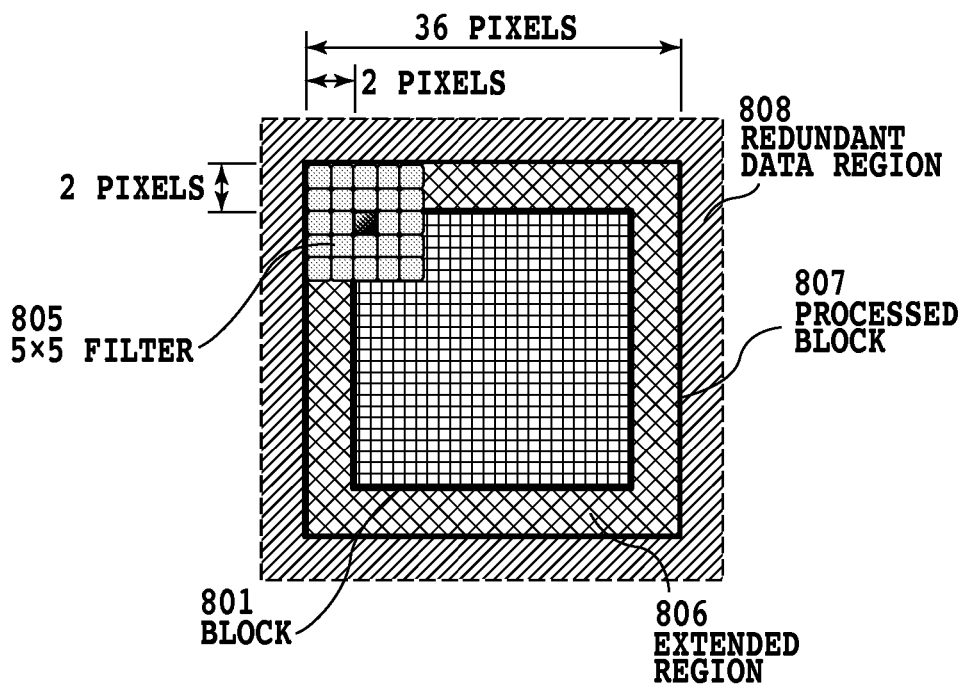
Figure 2:
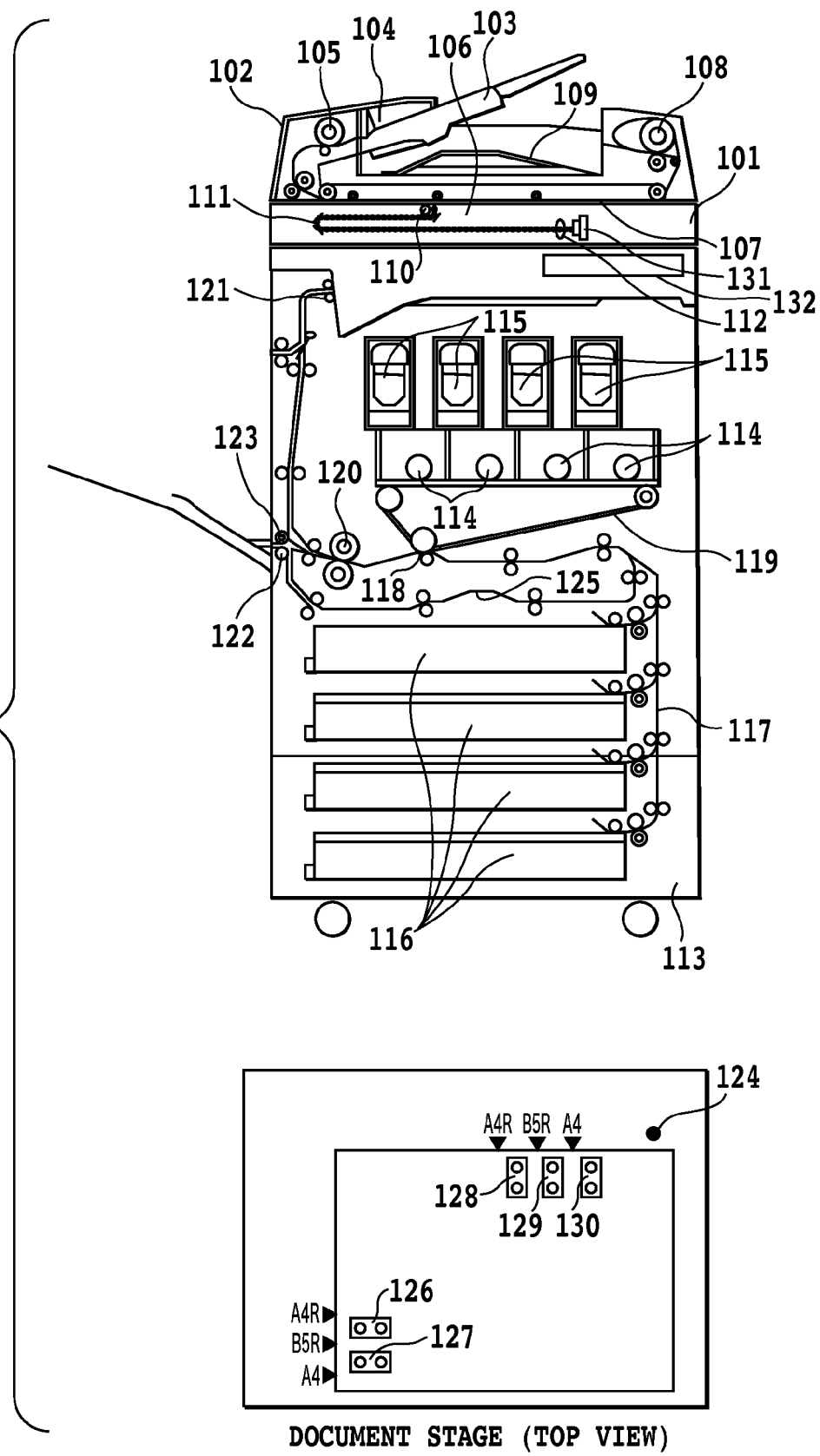
FIG. 2 is a cross-sectional view illustrating an image processing apparatus according to an embodiment.

FIG. 2 is a schematic cross-sectional view illustrating a full color image processing apparatus (a multi-functional apparatus with a copy function, printer function, and FAX function) according to an embodiment of the present invention. The image processing apparatus of this embodiment includes a scanner unit 101, a document feeder (DF) 102, and a printer unit 113 having a 4-color drum for printing.

First, description will be given for a read operation to be mainly performed by the scanner unit 101.

A document is placed on a document stage 107, and then the DF 102 is closed. Then, an open/close sensor 124 detects the document stage 107 having been closed, and thereafter, light-reflecting document size detection sensors 126 to 130, located at the housing of the scanner unit 101, detect the size of the placed document. Starting from the size detection, the document is illuminated with a light source 110, so that a CCD (Charge-coupled device) 131 receives reflected light from the document via a reflector 111 and a lens 112 to read the image. Then, a controller unit 132 of the image processing apparatus converts the image data read by the CCD 131 into a digital signal, and then performs image processing thereon for the scanner. The resulting signal is then stored as print image data in a memory 209, having ROM and RAM, in the controller unit 132.

The controller unit 132 described above will be described later with reference to FIG. 5.

In order to set an image on the DF 102 for reading, the user places the document with its face up on the tray of a document setting unit 103 of the DF 102. Then, a document presence sensor 104 detects the document having been set, and in response thereto, a document feed roller 105 and a conveyor belt 106 rotate to feed the document. Thus, the document is set in position on the document stage 107. Subsequently, the image is read in the same manner as at the document stage 107, and the resulting print image data is stored in the memory 209 of the controller unit 132.

After the reading has been completed, the conveyor belt 106 again starts rotating to feed the document, and the document is eventually ejected into a document delivery tray 109 via a delivery-side conveyor roller 108. In the case of a plurality of documents, a document is delivered out of the document stage 107 and at the same time, the next document is fed therein via the document feed roller 105, so that the next document is continually read. The scanner unit 101 operates just as described above.

Next, description will be given for the printing operation mainly performed at the printer unit 113.

The print image data once stored in the memory 209 of the controller unit 132 is again subjected to image processing for printing at the controller unit 132, as described later, and thereafter, transferred back to the printer unit 113. At the printer unit 113, the resulting print image data is converted into a pulse signal through the PWM control of the printer unit, to be described later, and then converted at the laser writing unit into recording laser beams of four colors, i.e., Yellow, Magenta, Cyan, and Black.

Then, the recording laser beams are projected onto a photo-conductor 114 for each color, thereby an electrostatic latent image is formed on each photo-conductor. Then, the printer unit 113 performs toner development of each photo-conductor 114 using the toner supplied from a toner cartridge 115, and then the toner image visualized on each photo-conductor is primarily transferred to an intermediate transfer belt 119. The intermediate transfer belt 119, rotating in the clockwise direction in FIG. 2, allows the toner image to be transferred from the intermediate transfer belt 119 to a sheet of recording paper when the recording paper fed from a sheet cassette 116 through a paper feed path 117 has reached a secondary transfer position 118.

The recording paper, to which the image has been transferred, has the toner fixed thereon by pressure and heat at a fixer 120, and is then fed along the feed path to be eventually delivered face down to a center tray 121 or face up to a side tray 122. In order to switch between these delivery ports, there is provided a flapper 123 which serves to switch between the feed paths.

For double-side printing, the flapper 123 switches between the feed paths after the recording paper has passed through the fixer 120. Subsequently, the recording paper is sent downwardly by switchback and fed back to a secondary transfer position 118 via a double-side print sheet feed path 125 for double-side printing.

Figure 3:
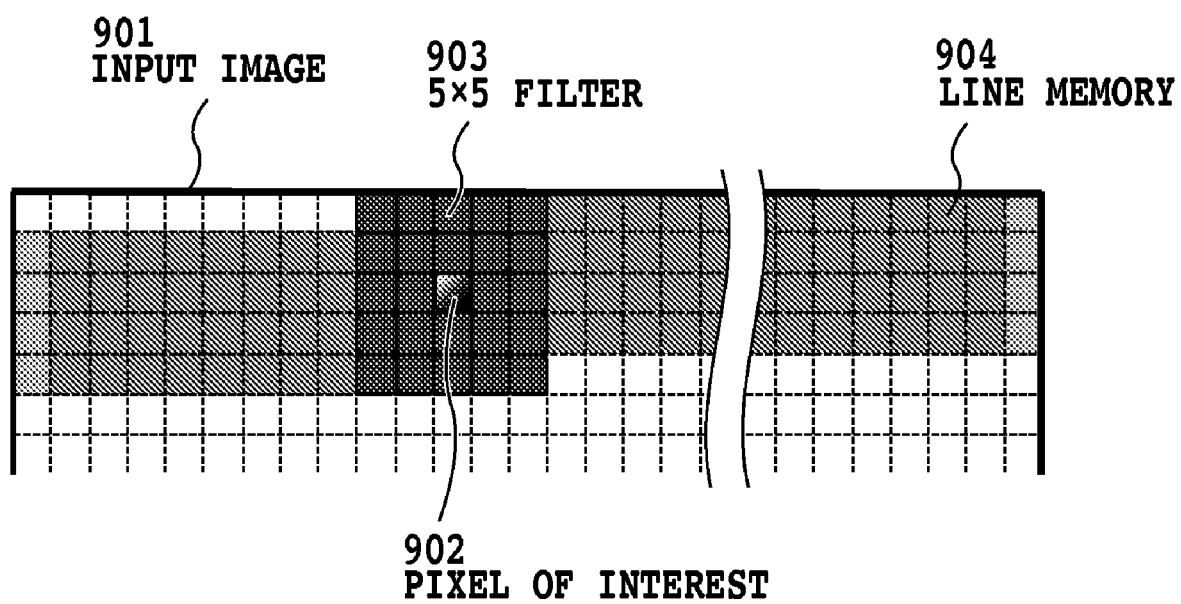
FIG. 3 is an explanatory view of band processing.

FIG. 3 is an explanatory view illustrating band processing.

In order to proceed with image processing by band processing, the processing is executed while a pixel of interest 902 is moved in sequence from the upper left of an input image 901. In order to perform filtering which requires surrounding image data in band processing, a line memory 904 of a full image width is required according to the filter size in order to save the pixel data preceding the pixel of interest. For example, in order to place a filter 903 of 5×5 pixels on the input image 901, the line memory 904 is required for a full 4 lines, while for a filter size of 7×7 pixels, the line memory 904 is required for a full of 6 lines.

The line memory capacity for a full one line has increased with recent increases in the image processing resolution and the number of signal bits, thus posing a problem with memory costs for filtering. For this reason, there has occurred a need for block processing, to be described later.

Figure 4A:
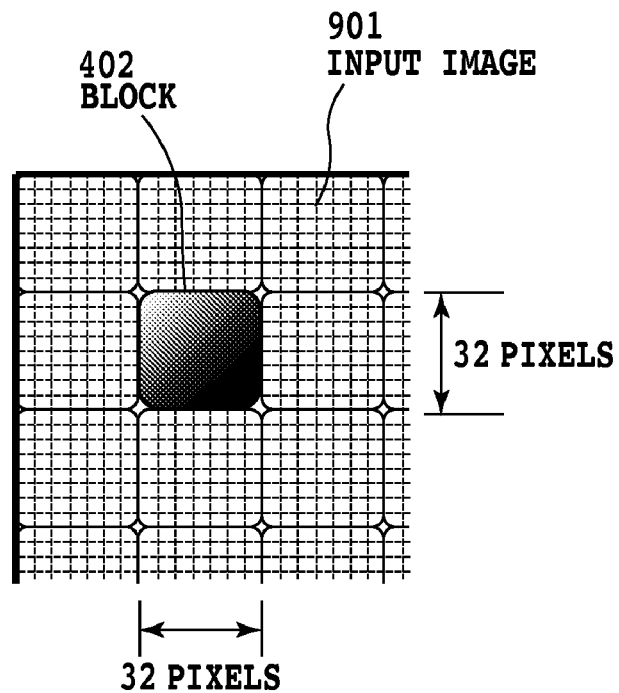
FIG. 4A is an explanatory view of block processing according to an embodiment.

FIG. 4A is an explanatory view illustrating block processing that is assumed in internal image processing of this embodiment. Block processing divides the input image 901 into rectangular blocks 402 having a predetermined size. Hereinafter, description will be given assuming that the rectangular region has a size of 32×32 pixels; however, the block size is not limited thereto. Thus, various types of required internal image processing will be performed block by block.

Figure 4B:
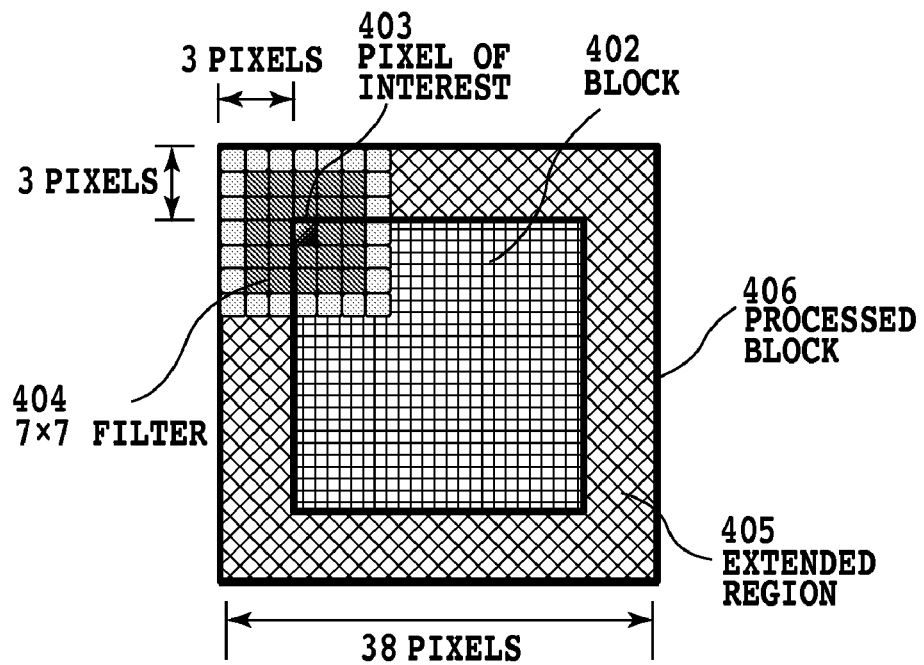
FIG. 4B is an explanatory view of computational processing of an extended region.

FIG. 4B is a view illustrating the concept of an extended region and the processing for computing the extended region, where the extended region is required for performing processing by referencing the pixel data of surrounding block regions such as filtering at block processing. Performing filtering on the pixel of interest 403 of the block 402 divided in FIG. 4A would cause the filter to extend out of the block. In this context, it is necessary to acquire data that overlaps the block adjacent to the block 402. These blocks are referred to as the "extended region." Suppose that a filter 404 of a given size (7×7 pixels in FIG. 4B) is placed on the block 402 of 32×32 pixels. In this case, as shown in FIG. 4B, information of 3 pixels surrounding the pixel of interest 403 is required. That is, as shown in FIG. 4B, for filtering of the block 402, an extended region 405 of a width of 3 pixels is provided by a processed block region creating unit 302 of FIG. 6, to be described later, thereby a processed block 406 of 38×38 pixels is produced.

When using the above-described processing, the required memory capacity depends only on the size of divided blocks, the filter size, and the number of signal bits. However, since the influence caused by an increase in the image processing resolution can be reduced only by a change in the filter size, there will be less chance that memory cost will increase with the resolution as in the case of band processing.

Figure 5:
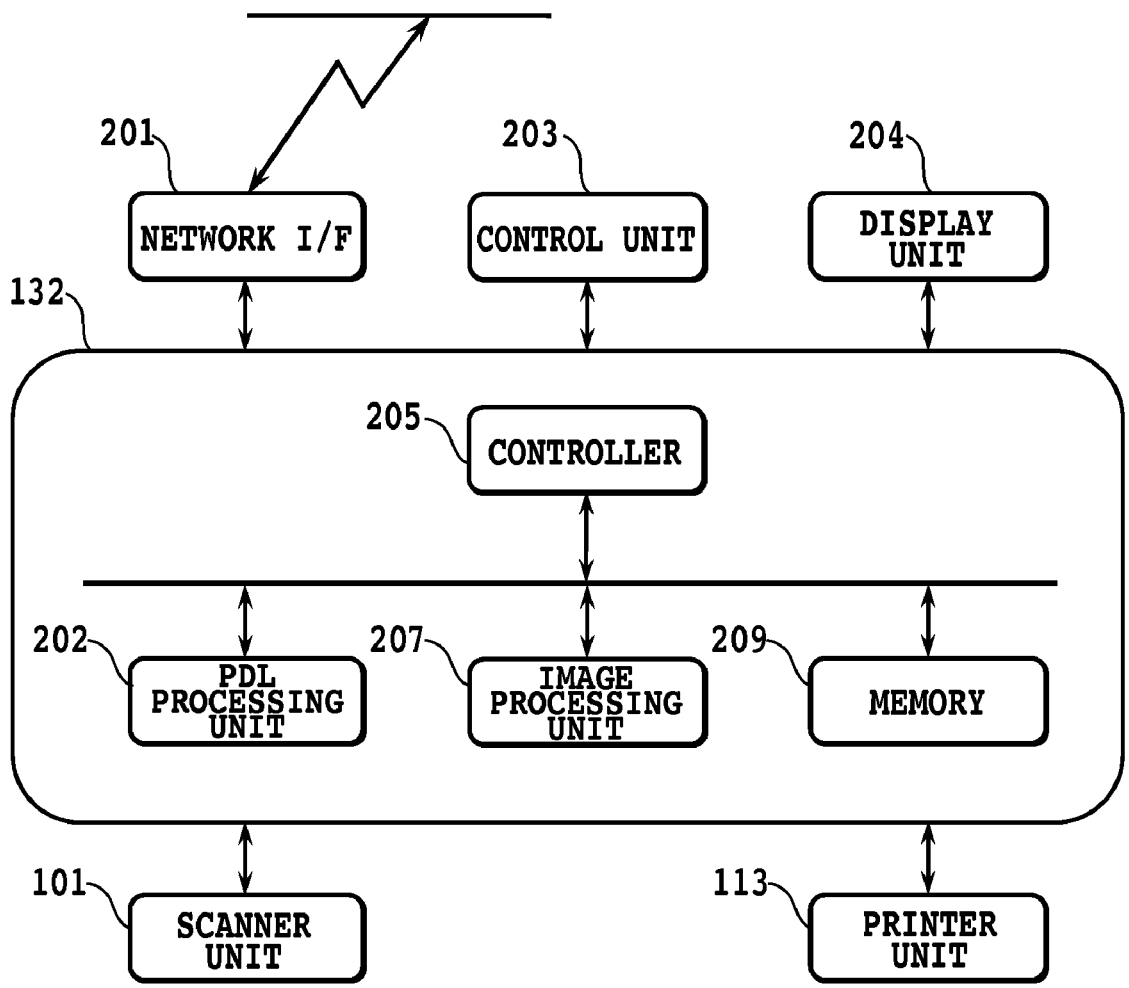
FIG. 5 is a view illustrating an example of a controller unit according to an embodiment.

FIG. 5 is an explanatory view illustrating the controller unit 132 for controlling the image processing apparatus according to the first embodiment shown in FIG. 2. Referring to FIG. 5, description will be given for the controller unit 132 of the image processing apparatus. The user makes settings of the copier on a control unit 203. Upon reception of an instruction from the user, a controller 205 provides control to a network I/F 201, a display unit 204, the scanner unit 101, and the printer unit 113.

Here, PDL data is received at the network I/F 201. Then, the PDL data described above is rendered at a PDL processing unit 202, and thereafter, the PDL data is sent to an image processing unit 207.

Furthermore, the scanner unit 101 sends, to the image processing unit 207, the image signal received by the scanner unit 101. The image processing unit 207 performs image processing on the received input signal to make it suitable for output by the printer, and then sends the image processed data to the printer unit 113.

The controller unit 132, which includes a number of units such as a FAX transmit/receive unit, is not directly related to the features of this embodiment and thus not described in more detail.

Figure 6:
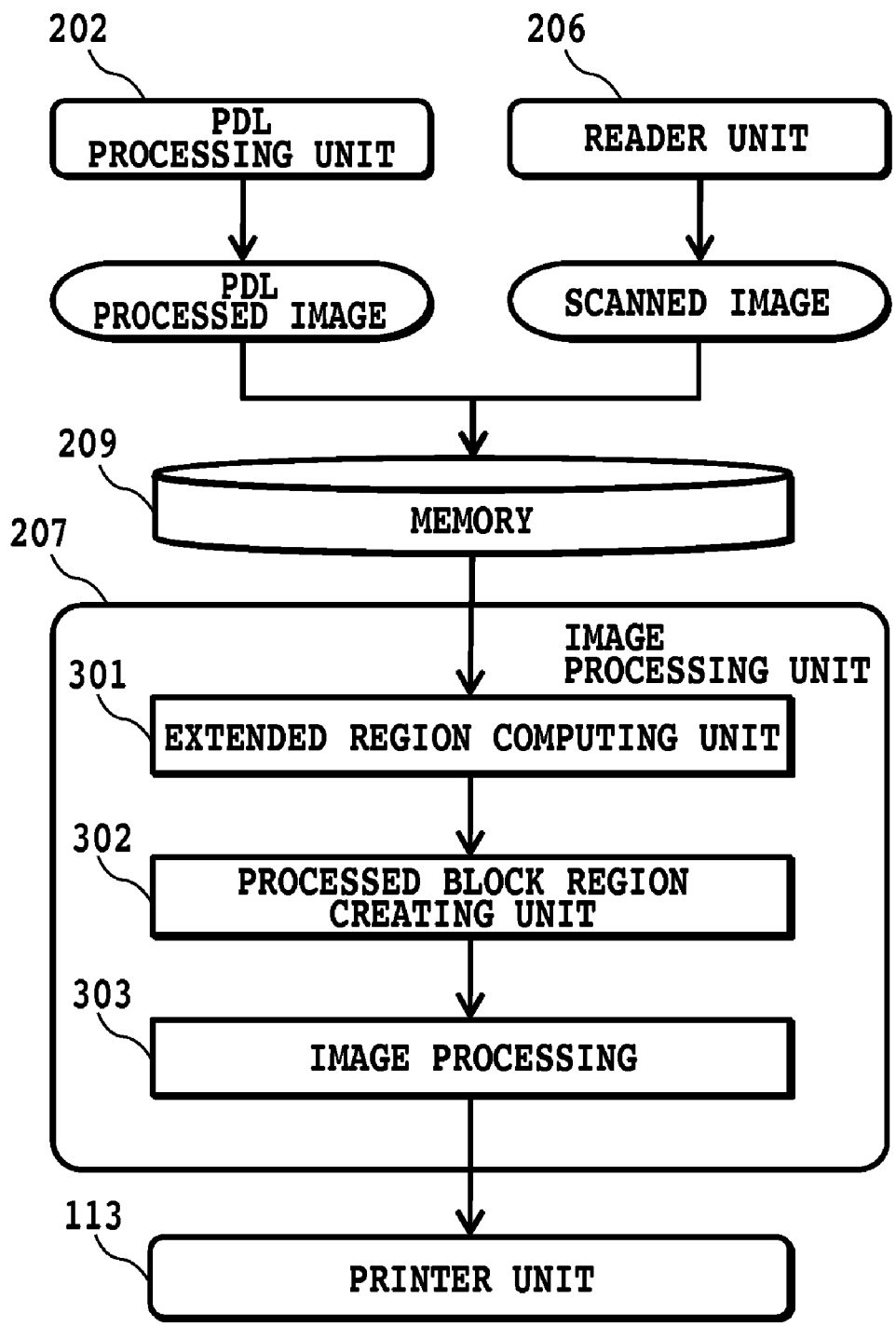
FIG. 6 is a view illustrating an example of an image processing unit according to a first embodiment.

FIG. 6 is an explanatory view illustrating an example of the image processing unit 207 according to this embodiment. Referring to FIG. 6, detailed description will now be made for image processing performed by the image processing apparatus.

The RGB/CMYK digital signals produced by the PDL processing unit 202 or the RGB digital image signals of the document read by the scanner unit 101 are spooled once in the memory 209.

The image processing unit 207 follows user instructions and the object attributes of the input image to change the image processing of image processing 303 of one or more image processing operations, to be described later, and processing parameters such as filter sizes, using those units that will be described later.

Here, the above-described user instruction includes, for example, resolution settings or image quality mode settings. Furthermore, the above-described object attributes are, for example, photograph or graphics.

Then, an extended region computing unit 301 computes an extended region required in the modified image processing 303 using the technique to be described later. The processed block region creating unit 302 reads a processed block with an extended region (a block with an extension) from the memory 209, the extended region being computed by the extended region computing unit 301 and added to the input block. Subsequently, the internal image processing involved in the image processing 303 is performed on the processed block for delivery of the output image to the printer unit 113.

Figure 7:
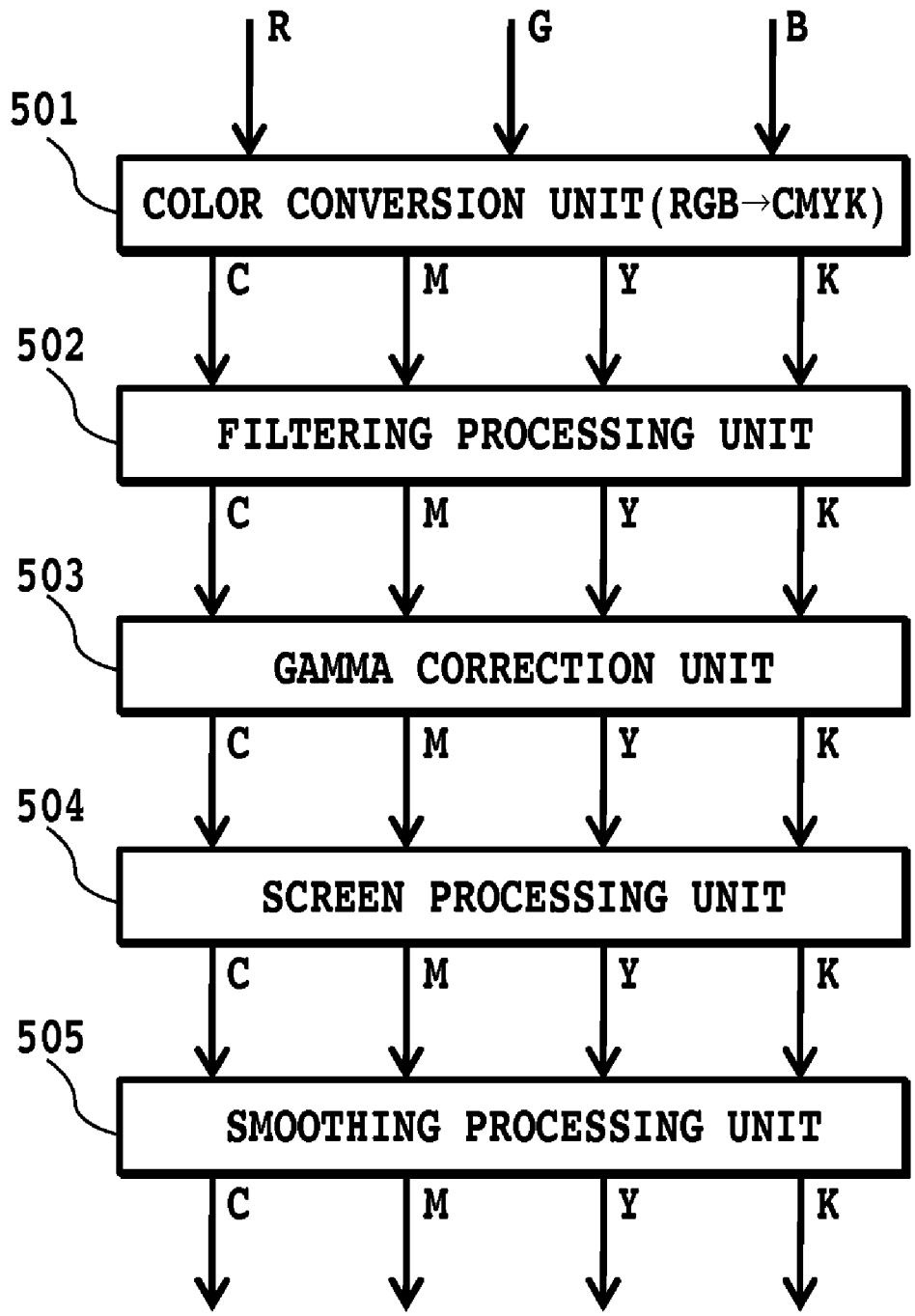
FIG. 7 is a view illustrating an example of image processing according to an embodiment.

FIG. 7 is a view illustrating an example of the above-described image processing 303 according to this embodiment. As shown in FIG. 7, the image processing 303 includes one or more image processing operations such as of a color conversion unit 501 and a filtering processing unit 502; however, the contents of image processing are not limited thereto.

Referring to FIG. 7, description will now be made for each image processing contained in the image processing 303 to be performed on the processed block 406 produced at the processed block region creating unit 302.

First, the color conversion unit 501 performs a color conversion on the input processed block to convert the RGB signal (8 bits for each color) and the CMYK signal to the CMYK (10 bits for each color). Then, the filtering processing unit 502 performs filtering, thereby making correction (such as sharpness enhancement) to the image that was color converted by the color conversion unit 501. At this stage, if a PDL signal is input, the degree of the correction is reduced. Alternatively, the setting may also be made so as not to allow the correction at all. Next, a gamma correction unit 503 performs gamma correction which corrects the gamma value that means the ratio of the luminance of the image to the input/output signal for reproducing the natural color, and a screen processing unit 504 executes screen processing for output to the printer. Subsequently, a smoothing processing unit 505 executes anti-aliasing to remove the occurrence of jaggy at the edge portions, thereby creating an output image. The processing of the image processing 303 of FIG. 6 and the parameter settings such as the filter size and the filter coefficient are modified as described later.

Figure 8:
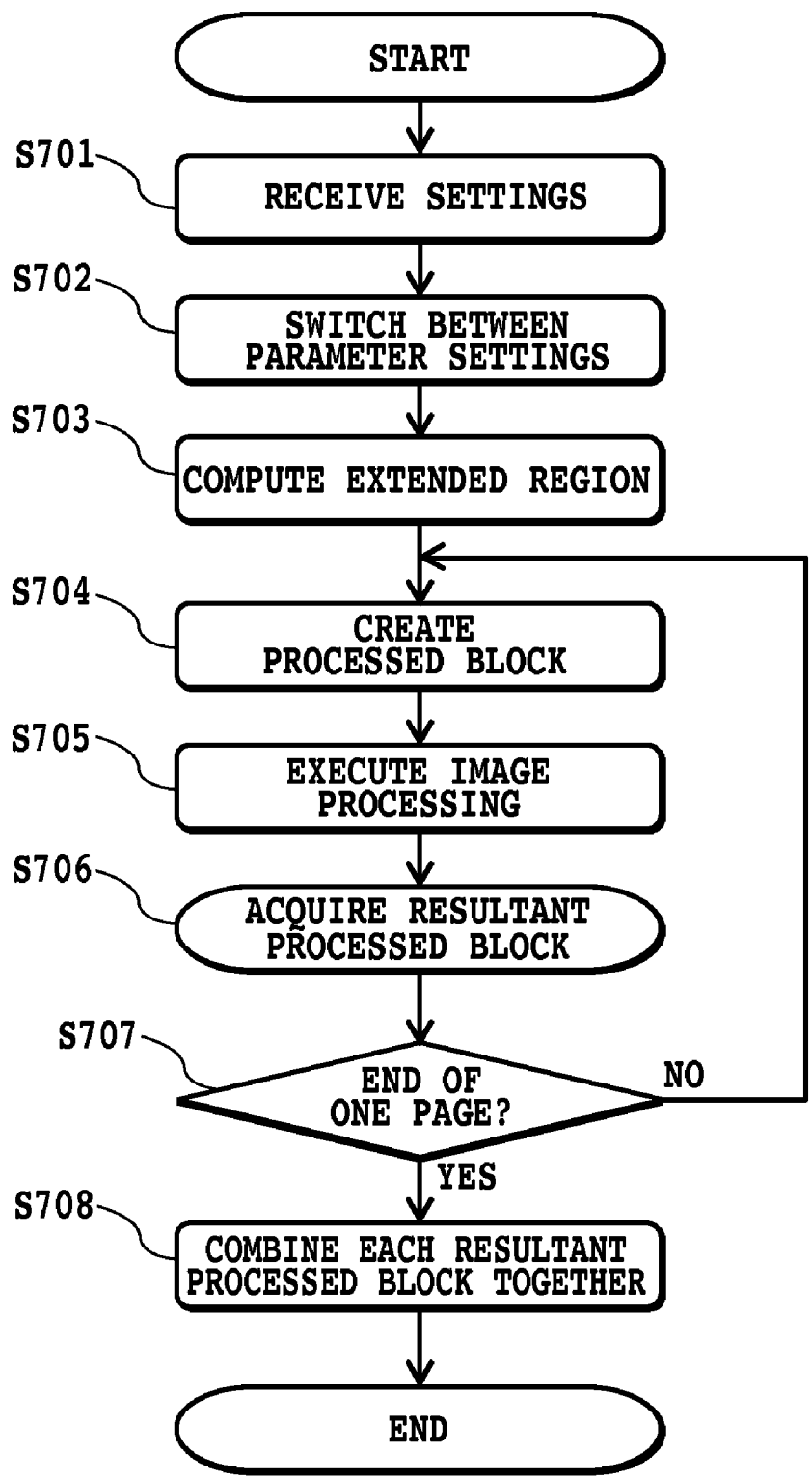
FIG. 8 is an explanatory flowchart for processing according to the first embodiment.

Now, referring to the flowchart shown in FIG. 8, description will be made for the flow of the processing according to the first embodiment of the embodiments. The memory 209 stores the program for executing the flowchart shown in FIG. 8, in which the CPU (not shown) in the controller 205 reads and executes the program stored in the memory 209, thereby the flowchart of FIG. 8 is allowed to be executed.

First, in step S701, the control unit 203 of the copier or a computer connected to a network receives settings of the image read format, the image output print quality, and the choice of printing mode. Here, for example, the printing mode includes the photograph mode (mode for printing of photograph) and the document mode (mode for printing of document).

In step S702, the image processing unit 207 switches between the parameter settings in accordance with the setting which have been received in step S701, the image input format, the type of the input image object. Here, the parameter settings include, for example, those of the image processing 303, the filter coefficient, and the filter size.

In step S702, the image input format is, for example, PDL, Scan, or Copy. Furthermore, in step S702, the type of object is, for example, graphics, photograph, and character.

Next, in step S703, the extended region computing unit 301 computes an extended region required for the image processing 303, based on the processing having been set in step S702.

Next, in step S704, the processed block region creating unit 302 generates a processed block added with the extended region computed in step S703.

Next, in step S705, the image processing unit 207 executes image processing 303 on the processed block produced in step S704.

Next, in step S706, the image processing unit 207 acquires the resultant processed block which has been obtained as a result of the image processing having been executed in step S705.

Next, in step S707, the image processing unit 207 determines whether a page of resultant processed blocks is acquired.

If it is determined in step S707 that a page of resultant processed blocks has been acquired, the process proceeds to step S708.

In step S708, the image processing unit 207 combines each resultant processed block, thereby a page of resultant processed blocks is generated.

On the other hand, if it is determined in step S707 that a page of resultant processed blocks has not been acquired, the process moves to a non-processed block, returning to the processing of step S704.

Each processing in step S701 to 707 will be described later in more detail.

Figure 9:
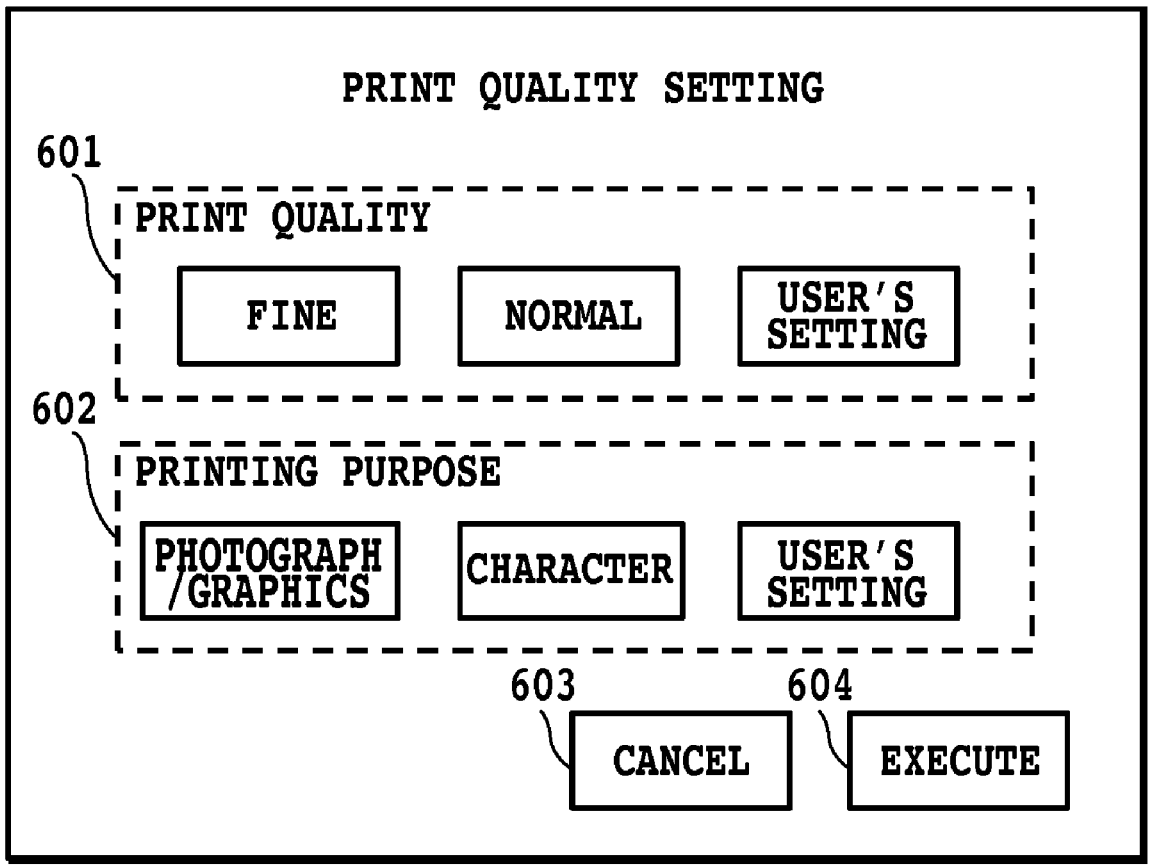
FIG. 9 is a view illustrating an example of a window according to an embodiment and a control unit displayed on MFP.

FIG. 9 shows an example of a print quality setting window of the display unit 204 which is presented to the user at the time of print quality setting before starting printing.

The user specifies print quality and output settings (printer setting information) on the window as displayed in FIG. 9 at the control unit 203 of the local computer or MFP (multi-functional printer). As the settings of print quality, buttons 601 allow the settings of print resolution to be provided, e.g., for Fine (1200 dpi)/Normal (600 dpi)/User setting (arbitrary resolution).

Furthermore, pressing buttons 602 allows for setting the printing mode that best fits with the desired output result. Thus, an optimal setting will be automatically selected to suit the respective modes, so that choosing the photograph/graphics mode provides the output in vivid colors, while selecting the character mode allows for executing processing to make the deformation of characters or jaggy less noticeable. In addition, it is also possible for the user to determine detailed settings using the user's setting button.

Furthermore, pressing a cancel button 603 would cancel the settings, while pressing an execute button 604 allows the print quality setting specified on the print quality setting window to be executed.

FIG. 10 shows an example of a table in which user's settings and images are associated with the parameters of the image processing. Referring to FIG. 10, description will be made for the procedures for changing the image processing 303.

Upon reception of user-specified settings entered at the control unit 203 and input images, the image processing unit 207 is based on the table of FIG. 10 to uniquely determine the settings of image processing and the parameters of the image processing in accordance with the printing job, thereby modifying the image processing 303.

For example, when compared to the PDL image, the scan/copy image would contain a larger amount of noise which may lead to deterioration in image. For this reason, as shown in FIG. 10, to remove the noise, a filter of a size larger than one for PDL image filtering can be adopted.

Furthermore, in accordance with the print quality setting provided in FIG. 9, the filter size for filtering is changed. For example, if the print quality "Fine" has been set, then the filter size is increased as compared with the print quality "Normal." This allows for increasing the strength of filtering and providing improved print quality.

Furthermore, the smoothing processing for allowing stepped aliasing (jaggy) occurring with diagonal lines or curves to be made less noticeable can adopt the following parameters.

For example, as shown in FIG. 10, the image processing unit 207 will not perform the smoothing processing when the input image is photograph or graphics.

Furthermore, for example, as shown in FIG. 10, the smoothing processing can use filters of different sizes according to the image quality setting when characters have been input. Furthermore, for example, as shown in FIG. 10, it is also possible to set so as not to perform the smoothing processing itself when characters have been input.

Figure 11A:
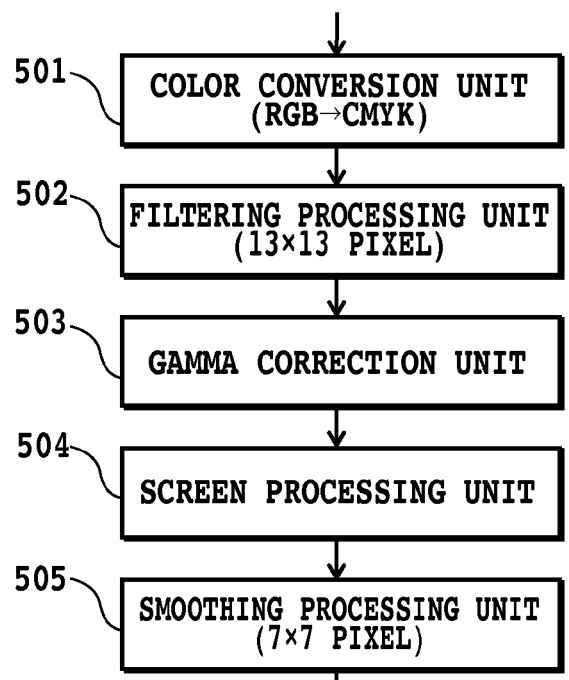
FIG. 11A is a view of an example of a change in image processing according to an embodiment, illustrating pre-modified image processing
Figure 11B:
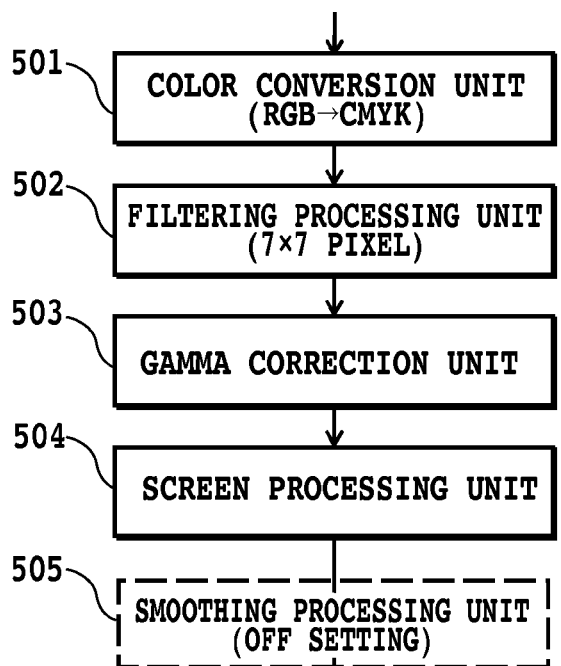
FIG. 11B and FIG. 11C are views of an example of a change in image processing according to an embodiment, illustrating post-modified image processing.
Figure 11C:
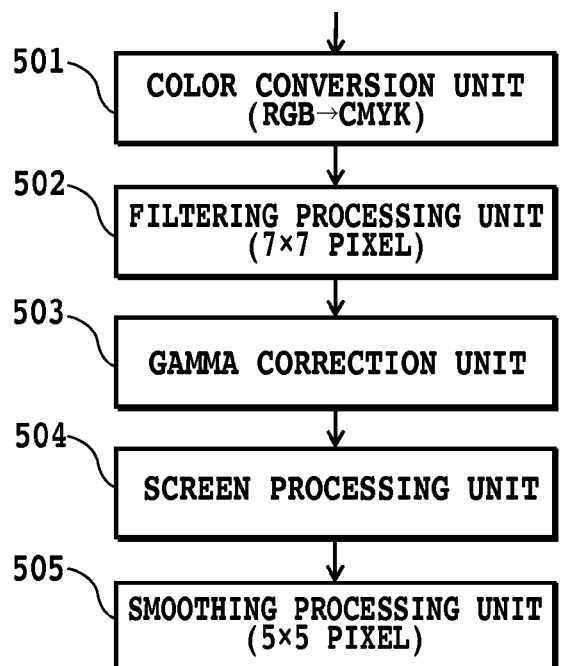

FIG. 11A, FIG. 11B and FIG. 11C show examples of modified image processing 303 performed in processing step S702.

The settings for the initial status of the image processing 303 have been provided so as to use all the internal image processing operations as shown in FIG. 11A, allowing the image processing parameters to take the maximum filter size available.

Here, for example, when for a scan/copy image, the image setting "Print quality: Normal, Printing purpose: photograph/graphics" has been provided by the user on the control window shown in FIG. 9, the processing below based on the table in FIG. 10 is executed. That is, as shown in FIG. 11B, the filter used for the filtering processing unit 502 selects not one of 13×13 pixels but one of 7×7 pixels. As for the smoothing processing 505, the processing itself is provided with the OFF setting, and thus removed from the image processing 303.

Furthermore, for example, when for a scan/copy image, the image setting "Print quality: Normal, Printing purpose: User's setting (ON [5×5])" has been provided by the user on the control window shown in FIG. 9, the processing below based on the table in FIG. 10 is executed. That is, as shown in FIG. 11C, the filtering processing unit 502 selects the filter of 7×7 pixels. Then, regarding the smoothing processing 505, the filter size is 5×5 pixels, thus allowing the image processing 303 to be updated.

Now, referring to FIG. 12A, FIG. 12B and FIG. 12C, description will be made for processing (step S703) for computing an extended region in the extended region computing unit 301, when two or more processing operations are involved that require the extension for the image processing 303.

The image processing of FIG. 11A involves the image processing 303 that includes processing, which makes reference to surrounding pixels, such as the 13×13 filtering processing unit 502 and the 7×7 smoothing processing 505. Now, description will be given for the processing for computing an extended region required to obtain a 32×32 pixel output block 410 as a result of this set of processing.

Figures 12A, 12B:
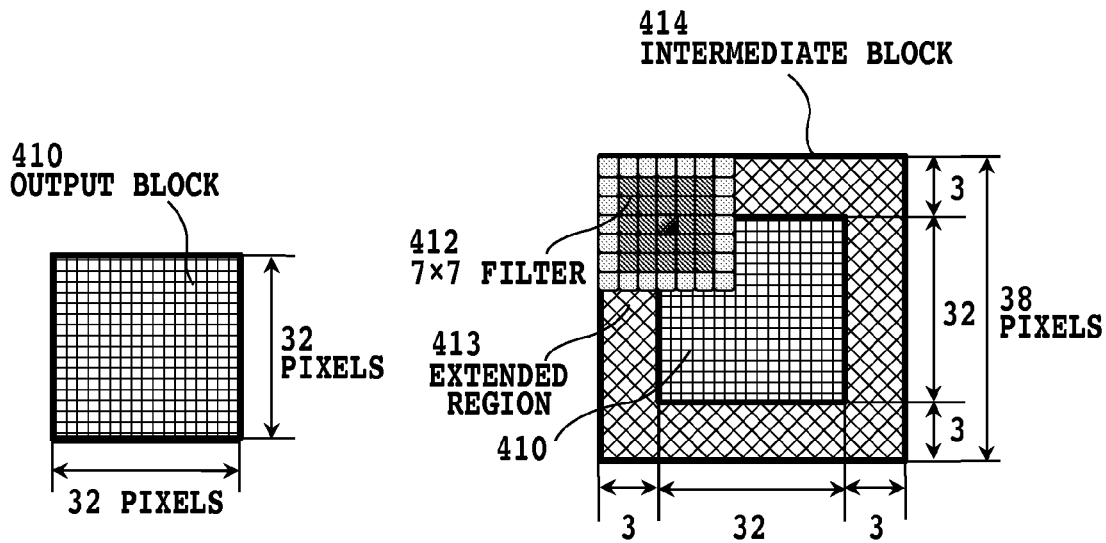
FIG. 12A, FIG. 12B and FIG. 12C are explanatory views illustrating extended region computational processing according to an embodiment.

First, as shown in FIG. 12B, in order to obtain the output block 410 by performing the 7×7 smoothing processing 505, an intermediate block 414 is produced to which an extended region 413 of 3 pixels in width is added to surround the same.

Figure 12C:
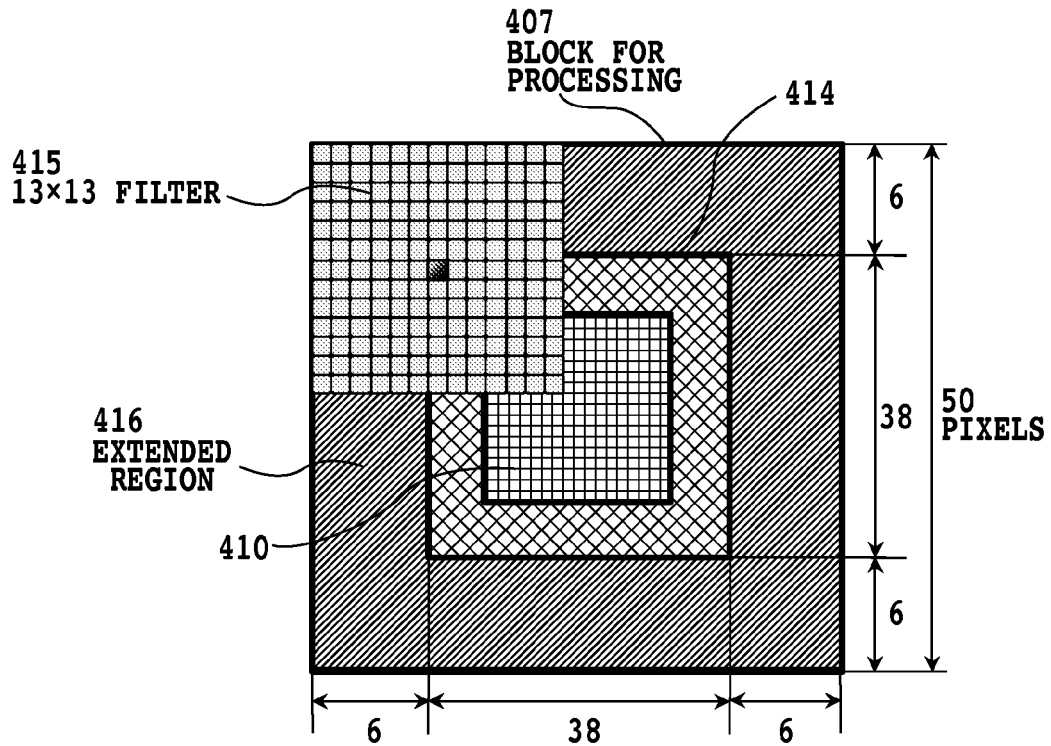

Next, as shown in FIG. 12C, the 13×13 filtering processing unit 502 is performed, and then to obtain the intermediate block 414, the processed block 407 is produced to which an extended region 416 of 6 pixels in width is added to around the same.

In this manner, the extended region 416 for the 13×13 filtering processing unit 502 and the extended region 413 for the 7×7 smoothing processing 505 are provided to the output block 410.

In this case, (6 pixels+3 pixels)=9 pixels in width serve as the extended region, requiring a processed block 407 of 50×50 pixels. As such, when there is a plurality of processes which require extended regions within the image processing 303, the total of the extended regions required for each of the processes is determined at the extended region computing unit 301 for provision by the processed block region creating unit 302.

In calculating an extended region required for each image processing in FIGS. 11(b) and (c), the extended region for the modified image processing (FIG. 11B) has a width of 3 pixels which is required only for the filtering unit. In this case, a processed block of 38×38 pixels is produced.

That is, modifying the image processing makes it possible to reduce the data amount of the processed block size to (38×38)/(50×50)=approximately 43% as compared with FIG. 11A.

For modified image processing (FIG. 11C), the extension amount with a width of (3 pixels+2 pixels)=5 pixels is provided to produce a processed block of 42×42 pixels. In this case, it is possible to reduce the data amount to (42×42)/(50×50)=approximately 71% compared with FIG. 11A.

In this embodiment, in accordance with the object of an input image and the user settings, the size of the required extended region is controlled. This eliminates the need for transferring excessive data, thereby reduced is the load for transferring the processed block added with the extended region. Furthermore, image processing is modified, thereby eliminated is the need for processing of excessive extended regions. Still furthermore, unnecessary processing needs not to be executed, thereby improved processing performance is provided.

Second Embodiment

Now, detailed description will be given for a second embodiment of the embodiments with reference to the drawings. In the description below, components that overlap those of the first embodiment will be omitted from detailed description.

In the first embodiment, the same extended region was adopted for all the processed blocks within one page. On the other hand, in the second embodiment, image analysis will be performed on the block to which an input image has been divided into a given size, thereby an optimal extended region for each block is determined. The processing for building the image processing according to the user's specification at the time of starting printing is the same as that of the first embodiment.

Figure 13:
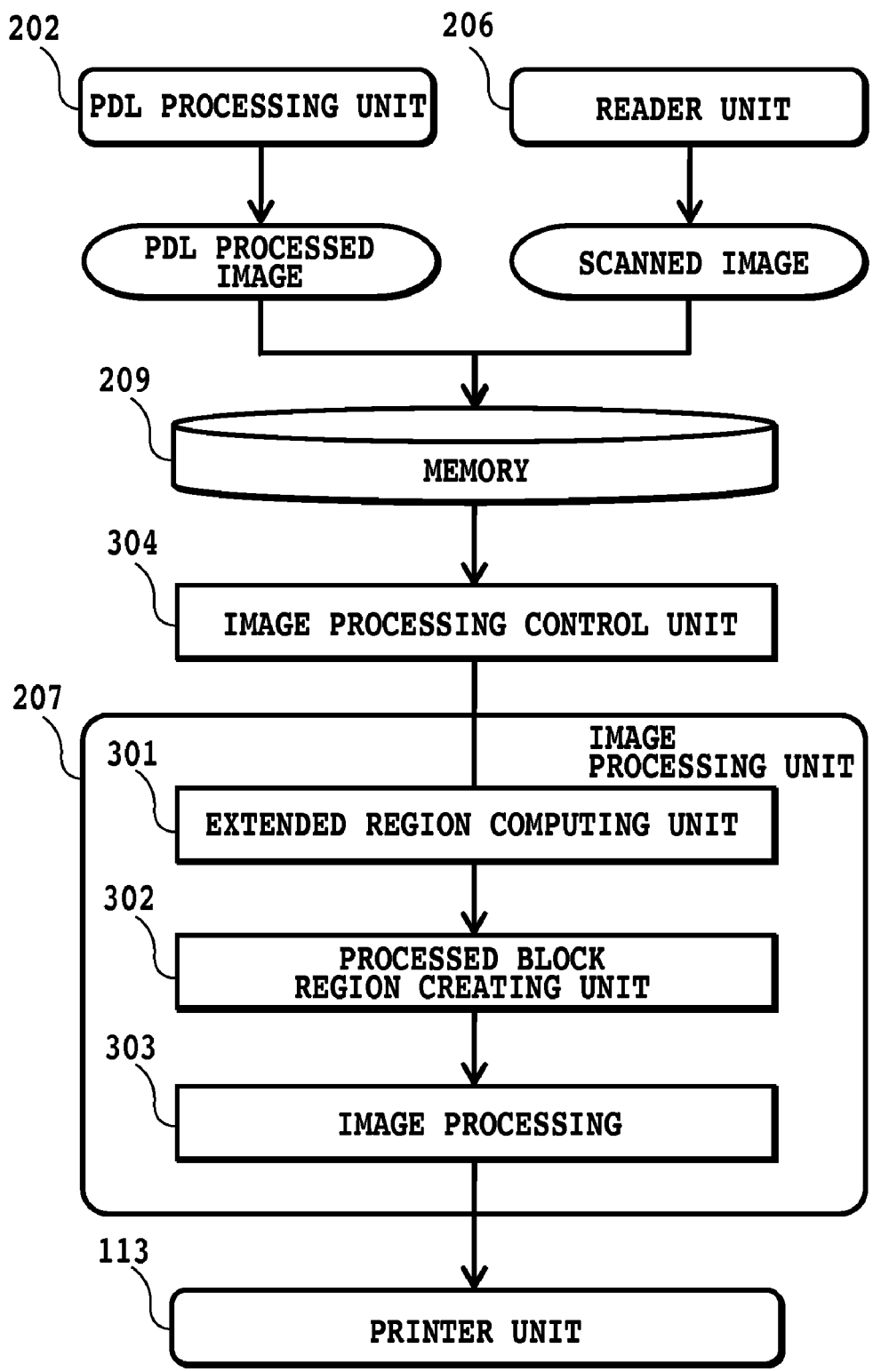
FIG. 13 is a view illustrating an example of an image processing unit according to a second embodiment.

FIG. 13 is an explanatory view illustrating an example of the image processing unit 207 according to the second embodiment. This is different from the first embodiment in that an image processing control unit 304 is included which functions to analyze the divided block and modify the image processing.

The image processing control unit 304 analyzes a divided block to modify the image processing 303. The analysis of the divided block is intended to determine, for example, the attributes of the block such as the object, character, and image or the amount of edges within the block. The modification of the image processing according to the divided block will be described later. As such, not only optimizing each job but also modifying the image processing for each divided block can optimize the entire image processing.

Figure 14:
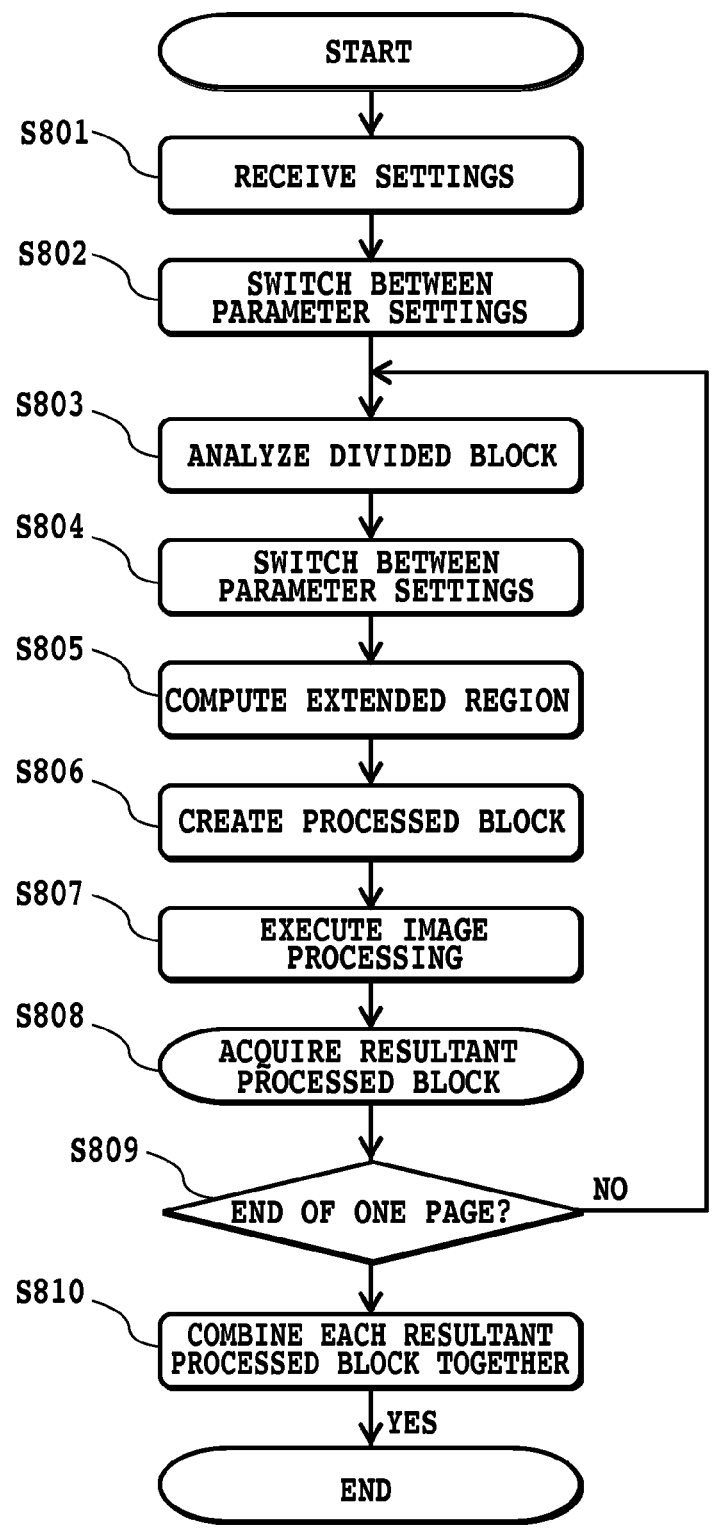
FIG. 14 is an explanatory flowchart for processing according to the second embodiment.

FIG. 14 is an explanatory flowchart showing the flow of the processing according to the second embodiment.

In the second embodiment, the processing in step S801 is the same as the processing of step S701 in FIG. 8 according to the first embodiment. Furthermore, in the second embodiment, the processing of step S802 is the same as the processing of step S702 in FIG. 8 according to the first embodiment.

In step S803, the second embodiment allows the image processing control unit 304 to analyze the respective blocks which have been divided from an input image into a given size.

Next, in step S804, the image processing unit 207 switches between the parameter settings.

Description will be given later for the analysis of the blocks divided in step S803 above and the switching between the parameter settings in step S804.

Next, in step S805, the extended region computing unit 301 computes an extended region which is optimal to the divided blocks.

Next, in step S806, the processed block region creating unit 302 generates a processed block added with the extended region computed in step S805.

After that, in step S807, the image processing unit 207 executes image processing 303 on the processed block produced in step S806.

Next, in step S808, the image processing unit 207 acquires the processed block that has been obtained as a result of the image processing having been executed in step S807.

Next, in step S809, the image processing unit 207 determines whether a page of resultant processed blocks has been obtained.

If it is determined in step S809 that a page of resultant processed blocks has been obtained, then the process proceeds to step S810.

In step S810, the image processing unit 207 combines each resultant processed block to generate a page of resultant processed blocks.

If it is determined in step S809 that a page of resultant processed blocks has not been obtained, then the process moves on to a non-processed block, returning to the processing of step S803.

FIG. 15 is a view illustrating an example of a table which associates the divided block with the contents of the divided block.

The image processing control unit 304 analyzes the divided block to modify the image processing 303.

For example, compressing the divided block may cause deterioration in image by noise-induced fine smearing on the edge portions of the image. In this context, for example, as shown in FIG. 15, filters of larger sizes can be used for the divided block of higher compressibility (higher degrees of image deterioration), thereby smoothing for noise removal can be performed. Here, the compressibility is determined based on the amount of the noise and the degrees of deterioration of edge of the image.

Furthermore, for example, filters of smaller sizes can also be adopted for the divided block of lower compressibility (lower degrees of image deterioration) without smoothing thereof so as to leave its originality as it is.

Furthermore, for example, as shown in FIG. 15, the divided block containing a character region would require smoothing to remove jaggy.

On the other hand, the smoothing would have no effects on the divided block containing the attribute of photograph/ graphics. Accordingly, as shown in FIG. 15, the smoothing is changed to ON only when the divided block contains characters.

Furthermore, for example, as shown in FIG. 15, the smoothing can also be eliminated for the processed block containing no data (i.e., underlying images).

Furthermore, the divided blocks may be compressed differently (by reversible compression or irreversible compression), so that the irreversible compression may cause the image processing to induce noise. Accordingly, for example, filters of larger sizes for removing noise may be adopted for the irreversible compression compared with the reversible compression.

Also in the second embodiment, the block size can be computed in the same manner as in the first embodiment.

As described above, this embodiment provides control for the size of the required extended region by taking the analysis result of the divided block into account in addition to the object of the input image and the user settings. This makes it possible to reduce the load for transferring the processed block and improve the processing performance.

Third Embodiment

The present invention can be realized as an implementation in the form of, e.g., a system, an apparatus, a method, a program, or a storage medium. More specifically, the invention may be applied to a system that includes a plurality of devices or to an apparatus that is made up of one device.

Note that the present invention allows the software program that realizes the function of the above-described embodiment (in the embodiment, the program associated with the illustrated flowchart) to be supplied directly or remotely to the system or the apparatus. The invention also applies to the case where the function is realized by the computer of the system or the apparatus reading and executing the supplied program code.

Accordingly, the program code itself installed in the computer to implement the function processing of the present invention by the computer is also regarded as realizing the present invention. That is, the present invention includes the computer program itself for realizing the function processing of the present invention.

In this case, the program may be in the form of, e.g., an object code, a program executed by an interpreter, or script data supplied to the OS as long as it has the program function.

The recording medium for supplying the program may include, for example, the floppy (trademark) disk, the hard disk, or the optical disk. Still furthermore, the recording medium may also include the magneto-optical disk, MO, CD-ROM, CD-R, CD-RW, magnetic tape, nonvolatile memory card, ROM, or DVD (DVD-ROM or DVD-R).

As an alternative method for supplying the program, the browser of a client computer may be used to connect to a homepage via the Internet. Then, the computer program itself of the present invention or a compressed file with an automatic function for installation can be supplied by downloading the same from the connected homepage to a recording medium such as a hard disk. It is also possible to divide the program code of the program of the invention into a plurality of files, each of which may be then downloaded from different homepages. That is, the present invention also includes a WWW server which allows the program file for implementing the function processing of the invention by the computer to be downloaded to a plurality of users.

Furthermore, the program of the present invention encrypted and stored on a storage medium such as a CD-ROM may be distributed to users, so that those users who meet the predetermined requirements are allowed to download the cryptographic key information from the homepage via the Internet. Then, the user is allowed to execute the encrypted program using the cryptographic key information and thereby install the program in the computer.

Still furthermore, the computer may read and execute the program, thereby the functions of the above-described embodiments are realized. On the other hand, based on the instructions of the program, for example, the OS running on the computer may perform a part of or all of the actual processing, thereby the functions of the above-described embodiments can be realized.

Furthermore, the program read from the recording medium may be written into a memory device which is included in a function extension board inserted in the computer or a function extension unit connected to the computer. Then, based on the instructions of the program, a CPU included in the function extension board or the function extension unit is allowed to perform a part of or all of the actual processing, thereby the functions of the above-described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-132324, filed May 20, 2008, which is hereby incorporated by reference herein in its entirety.

What is claimed is:

1. An image processing apparatus for performing image processing more than once by using an extended region, comprising:
   an input unit configured to input image data and printer setting information of the image data;
   an extended region computing unit configured to divide the image data into a plurality of block regions and compute an extended region of one of the divided block regions for each image processing operation;
   a generating unit configured to generate a processed block region comprising one of the block regions and an extended region added thereto that is computed using the extended regions computed for each image processing operation performed on the one of the divided block regions; and
   a processing unit configured to perform image processing on the processed block region produced by the generating unit,
   wherein the extended region required in each image processing operation for the one of the divided blocks is determined based on a size of a filter derived from the printer setting information.

2. The image processing apparatus according to claim 1, wherein the image processing of the processing unit is filtering processing or smoothing processing and the image processing performs the processing based on the printer setting information.

3. The image processing apparatus according to claim 1, further comprising a combining unit for combining each processed block region which has been image processed by the processing unit.

4. An image processing apparatus for generating, from an input image, a processed block region smaller than the input image and for performing processing on each generated processed block region, the image processing apparatus comprising:
  an image processing unit configured to process the input image through image processing involving a combination of more than one image processing operation;
  an extended region computing unit configured to determine a plurality of extended regions of a block region of the input image according to contents of the image processing operations; and
  a processed block region generating unit configured to generate the processed block region of the block region according to the determined plurality of extended regions,
  wherein an extended region of the processed block region is computed using the plurality of extended regions of the block region of the input image determined according to the contents of the image processing operations.

5. The image processing apparatus according to claim 4, wherein the extended regions are all required by all the image processing operations.

6. The image processing apparatus according to claim 4, wherein the image processing unit modifies the image processing specified according to an input method of the input image, and the extended region computing unit determines an extended region of a size required for the image processing.

7. The image processing apparatus according to claim 4, wherein the image processing unit modifies the image processing specified according to the resolution of the input image, and the extended region computing unit determines an extended region of a size required for the image processing.

8. The image processing apparatus according to claim 4, wherein the image processing unit modifies the image processing specified according to the input image, and the extended region computing unit determines an extended region of a size required for the image processing.

9. An image processing apparatus for performing image processing more than once by using an extended region, comprising:
  an input unit configured to input image data,
  an extended region computing unit configured to divide the image data into a plurality of block regions and compute an extended region of one of the divided block regions for each image processing operation, based on a result obtained by analyzing the one of the block regions;
  a generating unit configured to generate a processed block region comprising one of the block regions and an extended region added thereto that is computed using the extended regions for each image processing operation performed on the one of the divided block regions; and
  a processing unit configured to perform image processing on the processed block region produced by the generating unit,
  wherein the extended region required in each image processing operation is determined based on the analyzed result.

10. The image processing apparatus according to claim 9, further comprising a combining unit for combining each processed block region which has been image processed by the processing unit.

11. An image processing apparatus for generating, from an input image, divided blocks smaller than the input image to perform processing on each processed block region produced based on one of the divided blocks, the image processing apparatus comprising:
  an image processing unit configured to process the input image through image processing involving a combination of more than one image processing operation;
  an image processing control unit configured to analyze one of the divided blocks to modify the image processing;
  an extended region computing unit configured to determine a plurality of extended regions of one of the divided blocks according to contents of the image processing for each image processing operation; and
  a processed block region generating unit configured to generate a processed block region from the one of the divided blocks by adding an extension to the one of the divided blocks according to the determined plurality of extended regions,
  wherein the extension of the processed block region is computed using the determined plurality of extended regions.

12. The image processing apparatus according to claim 11, wherein the extended regions are all required by all the image processing operations.

13. The image processing apparatus according to claim 11, wherein the image processing control unit modifies the image processing according to an object contained in the divided block.

14. The image processing apparatus according to claim 11, wherein the image processing control unit modifies the image processing according to image deterioration of the divided block.

15. An image processing method for performing image processing more than once by using an extended region, comprising:
  an input step for inputting image data and printer setting information of the image data;
  an extended region computing step for dividing the image data into a plurality of block regions and computing an extended region of one of the divided block regions for each image processing operation;
  a generating step for generating a processed block region comprising one of the divided block regions and an extended region added thereto that is computed using with the extended regions computed for each image processing operation performed on the one of the divided block regions; and
  a processing step for performing image processing on a processed block region produced by the generating step,
  wherein the extended region required in each image processing operation for the one of the divided blocks is determined based on a size of a filter derived from the printer setting information.

16. An image processing method for generating, from an input image, a processed block region smaller than the input image and for performing processing on each generated processed block region, the method comprising:
  an image processing step for processing the input image through image processing involving a combination of more than one image processing operation;
  an extended region computing step for determining a plurality of extended regions of a block region of the input image according to contents of the image processing; and
  a processed block region generating step for generating the processed block region of the block region according to the determined plurality of extended regions,
  wherein an extended region of the processed block region is computed using the plurality of extended regions of the block region of the input image determined according to the contents of the image processing operations.

17. A non-transitory computer readable storage medium having a program stored thereon for causing a computer to perform image processing more than once by using an extended region, to execute the steps of:
- an input step for inputting image data and printer setting information of the image data;
- an extended region computing step for dividing the image data into a plurality of block regions and computing an extended region of one of the divided block regions for each image processing operation;
- a generating step for generating a processed block region comprising one of the block regions and an extended region added thereto that is computed using the extended regions computed for each image processing operation performed on the one of the divided block regions; and
- a processing step for performing image processing on a processed block region produced by the generating step,
- wherein the extended region required in each image processing operation for the one of the divided blocks is determined based on a size of a filter derived from the printer setting information.

* * * * *